United States Patent

Morton, Jr.

[11] Patent Number: 5,912,701
[45] Date of Patent: Jun. 15, 1999

[54] ARRANGEMENT FOR MEASURING AND CONTROLLING TEMPORAL RELATIONSHIPS BETWEEN CHANNELS OF A MULTIMEDIA COMMUNICATION SYSTEM

[75] Inventor: Alfred Channon Morton, Jr., Oceanport, N.J.

[73] Assignee: AT&T Corp., Middletown, N.J.

[21] Appl. No.: 08/853,771

[22] Filed: May 9, 1997

[51] Int. Cl.$^6$ ........................................ H04N 5/04
[52] U.S. Cl. ..................... 348/192; 348/515; 348/423; 348/17; 370/241; 370/519; 375/356
[58] Field of Search ...................... 348/192, 191, 348/193, 515, 614, 423, 465, 14, 17; 370/506, 241, 252, 519; 375/362, 376, 260, 356; H04N 5/104

[56] References Cited

U.S. PATENT DOCUMENTS

| | | | |
|---|---|---|---|
| 3,781,795 | 12/1973 | Zegers | 371/41 |
| 5,396,497 | 3/1995 | Veltman | 348/423 |
| 5,586,111 | 12/1996 | Wise | 370/241 |
| 5,621,720 | 4/1997 | Bronte et al. | 370/13 |
| 5,719,786 | 2/1998 | Nelson et al. | 348/19 |
| 5,751,766 | 5/1998 | Kletsky et al. | 348/192 |
| 5,784,119 | 7/1998 | Noda et al. | 348/423 |

*Primary Examiner*—John K. Peng
*Assistant Examiner*—Jean W. Désir

[57] ABSTRACT

A method for ascertaining the temporal relationship between two signals that traverse a network via two different channels concurrently sends a test signal through the two channels and evaluates the temporal relationship of the signal received at the outputs of the channels. The test signal is divided into presentation units and the temporal relationships are evaluated for foursomes of presentation units. A foursome of presentation units consists of an output presentation unit of one channel (channel 1), a matching input presentation unit of the same channel (channel 1), an input presentation unit of the other channel (channel 2) which has a time stamp that is identical, or essentially identical, to the time stamp of the input presentation unit of the one channel, and an output presentation unit of channel 2 which matches the input presentation unit of channel 2. The time stamps of the presentation units in the foursome are used to develop a measure of the difference in delays between the first channel and the second channel, as a set of difference thus obtained for different foursomes provides the data for a statistical evaluation of the difference in delays between the channels. This information is useful for various purposes, including adjusting the delay in the channels to obtain a more balanced transmission.

19 Claims, 4 Drawing Sheets

ARRANGEMENT FOR MEASURING AND CONTROLLING TEMPORAL RELATIONSHIPS BETWEEN CHANNELS OF A MULTIMEDIA COMMUNICATION SYSTEM

BACKGROUND OF THE INVENTION

This invention relates to communications and, more particularly, to communications over a plurality of channels.

Multimedia, as the name implies, comprises information that is intended for different presentations. This includes, for example, video and audio, video and data, etc. Often, multimedia arrangements employ different channels in a communication network for communicating the different information portions that belong to the different media. Those different channels can have different transfer characteristics, such as delay, attenuation, digital rate conversion, etc. There are even applications where the communication network simply discards information or creates segments of replicated information.

In situations as described above, where different channels are used for communicating multimedia information signals, there is a potential danger that the receiving end will receive the information from the different channels in a temporal relationship to each other that is different from the temporal relationship of the sent information. This, of course, can become quite objectionable to users. For example, when the video image of a speaking person is not synchronized with the voice of the utterances spoken, the users' perception is that the transmission and/or the source are flawed.

What is needed, therefore, is a method for measuring the temporal relationship between different channels so that appropriate channels are selected, or so that the channels can be modified to produce an improved state of temporal synchronization.

SUMMARY

The temporal relationship between two signals that traverse a network via two different channels is evaluated by concurrently sending a test signal through the two channels and evaluating the temporal relationship of the signal received at the outputs of the channels. The test signal is divided into distinct presentation units and the temporal relationships are evaluated for foursomes of presentation units. A foursome of presentation units consists of an output presentation unit of one channel (channel 1), a matching input presentation unit of the same channel (channel 1), an input presentation unit of the other channel (channel 2) which has a time stamp that is identical, or essentially identical, to the time stamp of the input presentation unit of the one channel, and an output presentation unit of channel 2 which matches the input presentation unit of channel 2. The time stamps of the presentation units in the foursome are used to develop a measure of the difference in delays between the first channel and the second channel, as a set of differences thus obtained for different foursomes provides the data for a statistical evaluation of the difference in delays between the channels. This information can be used for various purposes, including adjusting the delay in the channels to obtain a more satisfying transmission for the users of the two channels.

DETAILED DESCRIPTION

Figure 1:
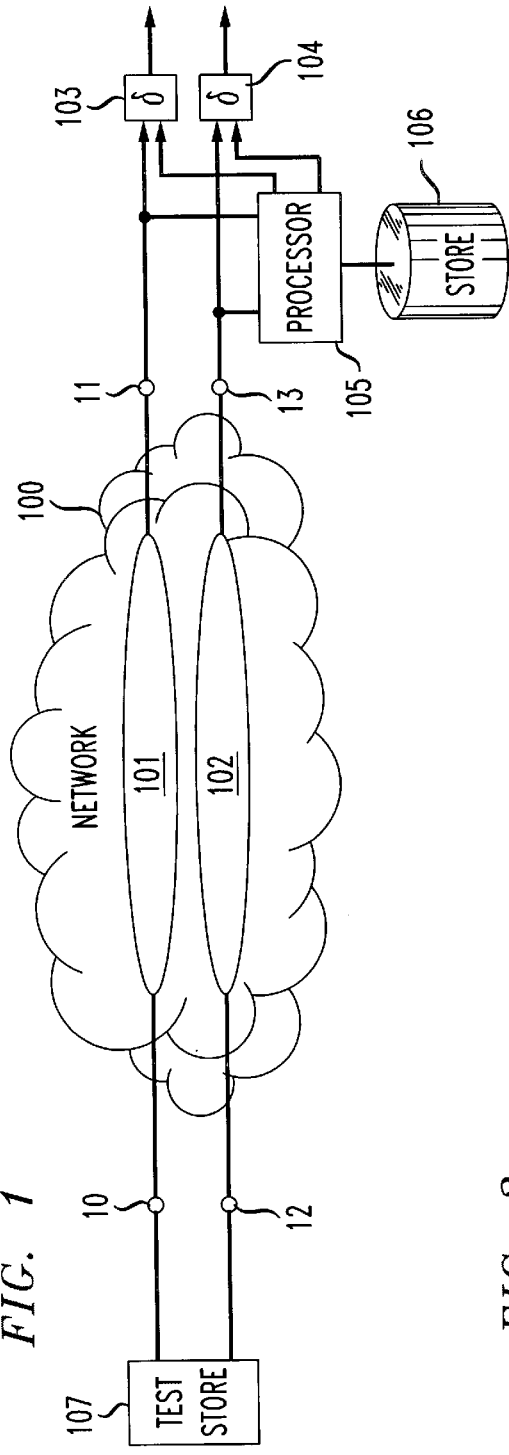
FIG. 1 presents a block diagram of an arrangement in the context of which the instant invention may be practiced.

FIG. 1 presents a generalized picture of a communications network 100 that includes a channel 101 which connects input port 10 to output port 11 and a channel 102 which connects input port 12 to output port 13. The network passes the signals from the input ports to the output ports. At least through a portion of channels 101 and 102, the signals traverse network 100 in digital form. Precisely what processes are carried out in the network is not material to this disclosure, save for the understanding that the channels can corrupt the traversing signal by, for example, introducing delay, losing information, creating duplicate information, etc. The discussion below begins with the assumption that ports 10 and 12 are used to transmit a progressive-scan video signal (the type that a personal computer (PC) typically employs) and an accompanying audio signal, respectively.

In accordance with the instant disclosure, the signals applied to ports 10 and 12 are divided into presentation units. A presentation unit is a convenient segment of the signal being sent. A progressive-scan video signal comprises a succession of video frames. Each frame comprises a plurality of pixels that are arranged in successive lines which form an array of pixels on a PC screen. For purposes of this disclosure, a video frame is a useful choice for a presentation unit of a progressive-scan video signal stream. When the multimedia signal comprises video and audio, the presentation unit selected for audio may advantageously be selected to correspond to the same time interval that is represented by the associated video frame.

In order to test and characterize the temporal behavior of channels 101 and 102, it is convenient to employ a preselected test signal that is applied to ports 10 and 12, e.g., by test apparatus 107. In accordance with the present disclosure, the test signal is divided into presentation units, and a clock signal is associated with the test signal to form time stamping of the presentation units. The test signal can be mapped onto a 3-column table—and indeed can be so stored (both at the sending end within apparatus 107, and at the receiving end within storage medium 106)—where the first column corresponds to the video signal, the second column corresponds to the audio signal, and the third column corresponds to time. A video signal entry in a row of the table includes the signal of a video presentation unit, an audio signal entry in the same row includes the signal of an audio presentation unit that corresponds (i.e., represents the same time interval) to the video presentation unit, and the time entry in the same row marks the time of the presentation units. Any time that is relevant to the presentation units may be employed, but selecting the time when the presentation unit ends may have some advantages.

Figure 2:
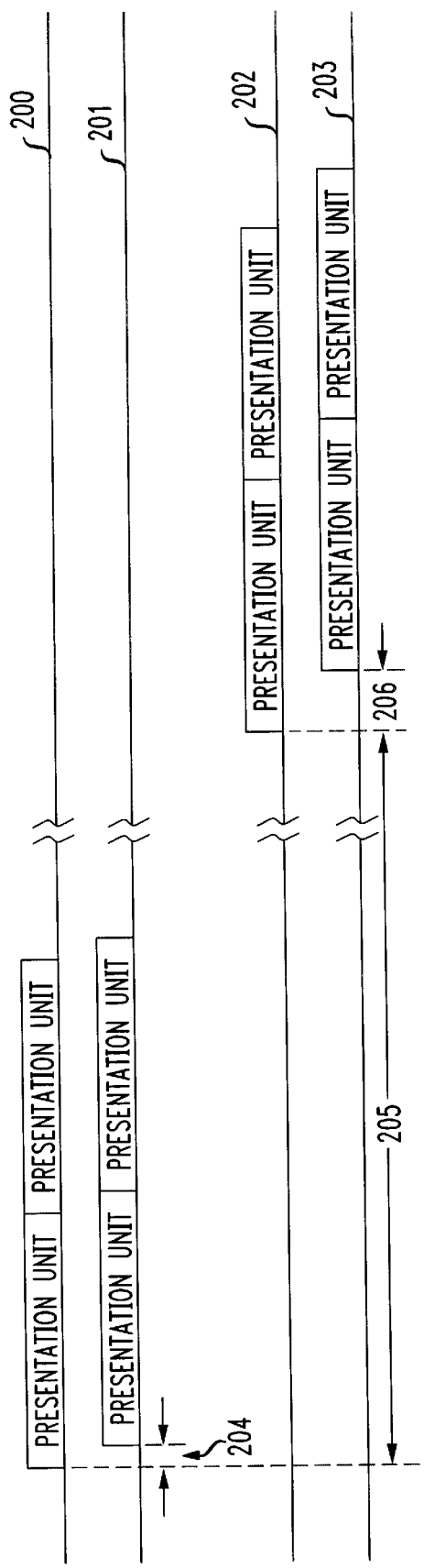
FIG. 2 illustrates skew situations in pairs of signals that flow through different communication channels.

FIG. 2 presents an input pair of presentation units on lines 200 and 201 and a corresponding output pair of presentation units on lines 202 and 203. Interval 204 corresponds to a skew between a presentation unit of line 200 and the nearest presentation unit of line 201. When the signal on line 200 is a video signal and the signal on line 201 is an associated audio signal, there need not be any skew between the presentation units of lines 200 and 201, as indicated above.

But in the general case, the nature of the signal on line 201 may suggest a particular division for presentation units and, in such circumstances, it is quite possible to have a non-zero skew 204. The output signals at ports 11 and 13 are shown in lines 202 and 203. Interval 205 corresponds to the transit time of the line 200 presentation unit, and interval 206 corresponds to the skew between the presentation unit of line 202 and the presentation unit of line 203 (at output ports 11 and 13, respectively). Interval 206 may be different from interval 204 because of the difference in the characteristics of channels 101 and 102. The difference between intervals 206 and 204 is the skew caused by network 100.

The challenge is to determine what this skew is.

Figure 3:
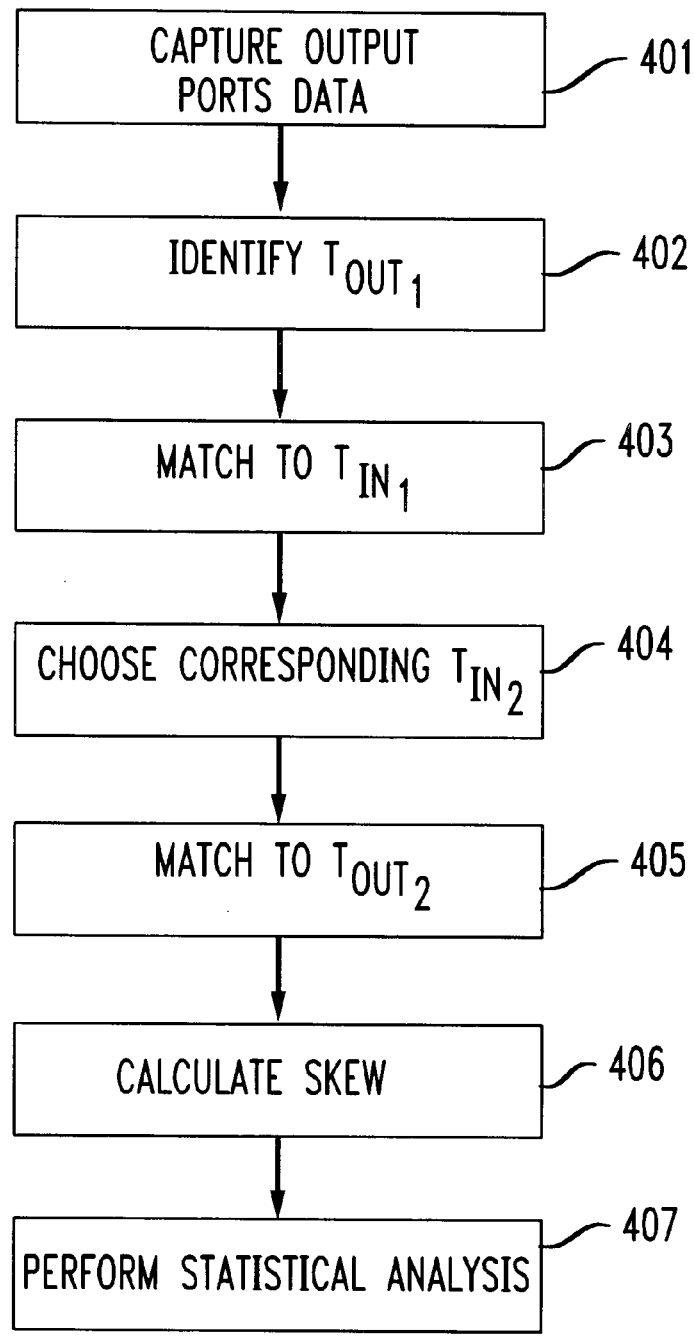
FIG. 3 is a general flow chart of the method disclosed herein.

In accordance with this disclosure, the skew caused by network 100 is determined by applying the test signals to ports 10 and 12, capturing the resulting output signals at ports 11 and 13 and storing the captured information together with a time stamp (block 401 in FIG. 3), and analyzing the stored signals relative to the test signals. The method of analyzing, carried out in processor 105 which is coupled to ports 11 and 13, comprises the steps of identifying an output presentation unit at port 11 (block 401 in FIG. 3) and noting its time stamp, say, $Tout_1$; finding a matching input presentation unit of port 10 (block 402) and noting its time stamp, say, $Tin_1$; taking an input presentation unit of port 12 (block 403) that has the same (or nearest) time stamp as the matched input presentation unit of port 10, say, $Tin_2$; finding a matching output presentation unit at port 13 (block 404), say, $Tout_2$; and calculating (block 405) skew $(Tout_1-Tout_2)-(Tin_1-Tin_2)$. By the way, a variation of the skew equation, which is equivalent, is $(Tout_1-Tin_1)-(Tout_2-Tin_2)$. Further analysis of the set (e.g., statistical analysis) can be conducted (block 406) to obtain additional data such as the minimum skew, the maximum skew, the mean skew, the median skew, the skew distribution, etc.

One of the major challenges of the above-presented process is to find matched (input and output) presentation unit pairs. In order to understand the difficulty, it is useful to delve a bit into the processes that may take place in the network.

When, because of protocol interaction between network 100 and the equipment at the receiving end (ports 11 and 13), a certain rate is agreed upon, it follows that network 100 will attempt to provide the agreed-upon rate. When the source produces a rate that is higher than the agreed-upon rate, some of the input's data must be discarded. On the other hand, when the source produces a rate that is lower than the agreed-upon rate, some data must effectively be created. In connection with video signals, the created data is typically a replication of an entire video frame. Another circumstance where data may be replicated might occur because of synchronization problems that result from slight clock differences. That is, even if the nominal clock rates of the sending and receiving equipment are the same, if the sending clock rate is a bit slower than expected, there will certainly be instances when data is required but unavailable. In such instances, data must be created and, as suggested above, when the signal represents video frames, typically that is effected by a replication of an entire frame. Variable transit delay is also an important factor, and such delay can vary widely when the network employs certain digital channels (packet transmission channels, for example, can produce widely varying delays because delays are affected by channel traffic load).

In short, for a variety of reasons, given a presentation unit at an output port of network 100, it is not a simple matter to find a matching presentation unit injected at a corresponding input port of network 100.

In connection with video signals, one can categorize the frames into four types:

1. Active frames. Those are frames that were sent at port 10 and traversed network 100 to port 11.
2. Repeated frames. Those are frames that were generated within the network and may have traversed some, all, or perhaps essentially none of the channel.
3. Repeated input frames. Those are frames that are active frames in the sense that they were applied to the input port and traversed the network, but they are repeated frames in the sense that they contain no new information relative to preceding frames.
4. Missing frames. Those are active frames that were discarded or lost by the network. To the extent that those frames are needed to maintain the required or expected output rate, they are replaced with repeated frames.

The same categorizations can be applied to audio signals (except that the reference would be to presentation units, rather than to video frames).

Thus, the challenge is to find matches of presentation units in an environment which can corrupt a transmitted signal as described above in addition to corruptions that relate to gain, offsets, scaling, etc.

Figure 4:
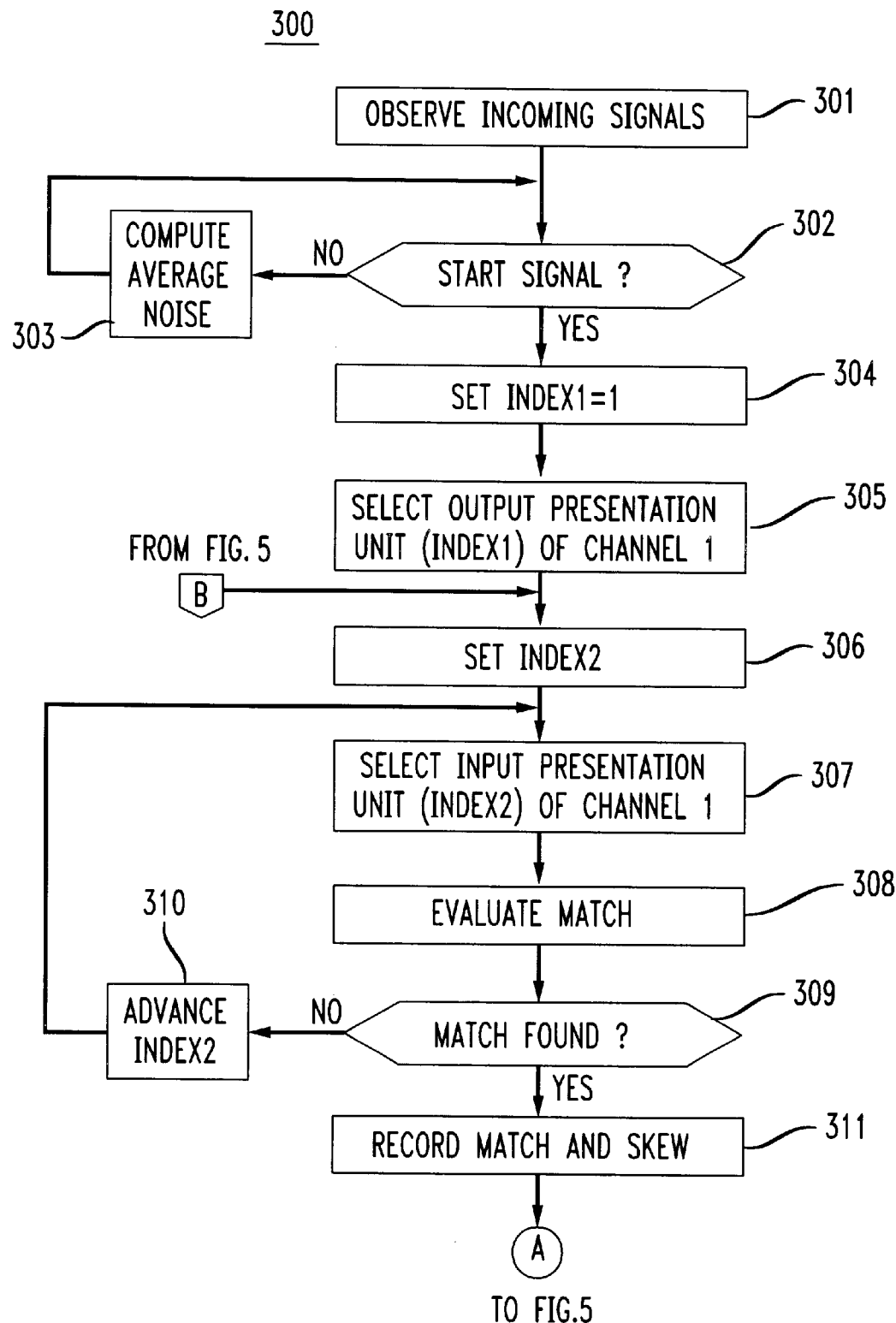
FIGS. 4 and 5 present a more detailed flow chart of the process disclosed herein for finding matching presentation units.
Figure 5:
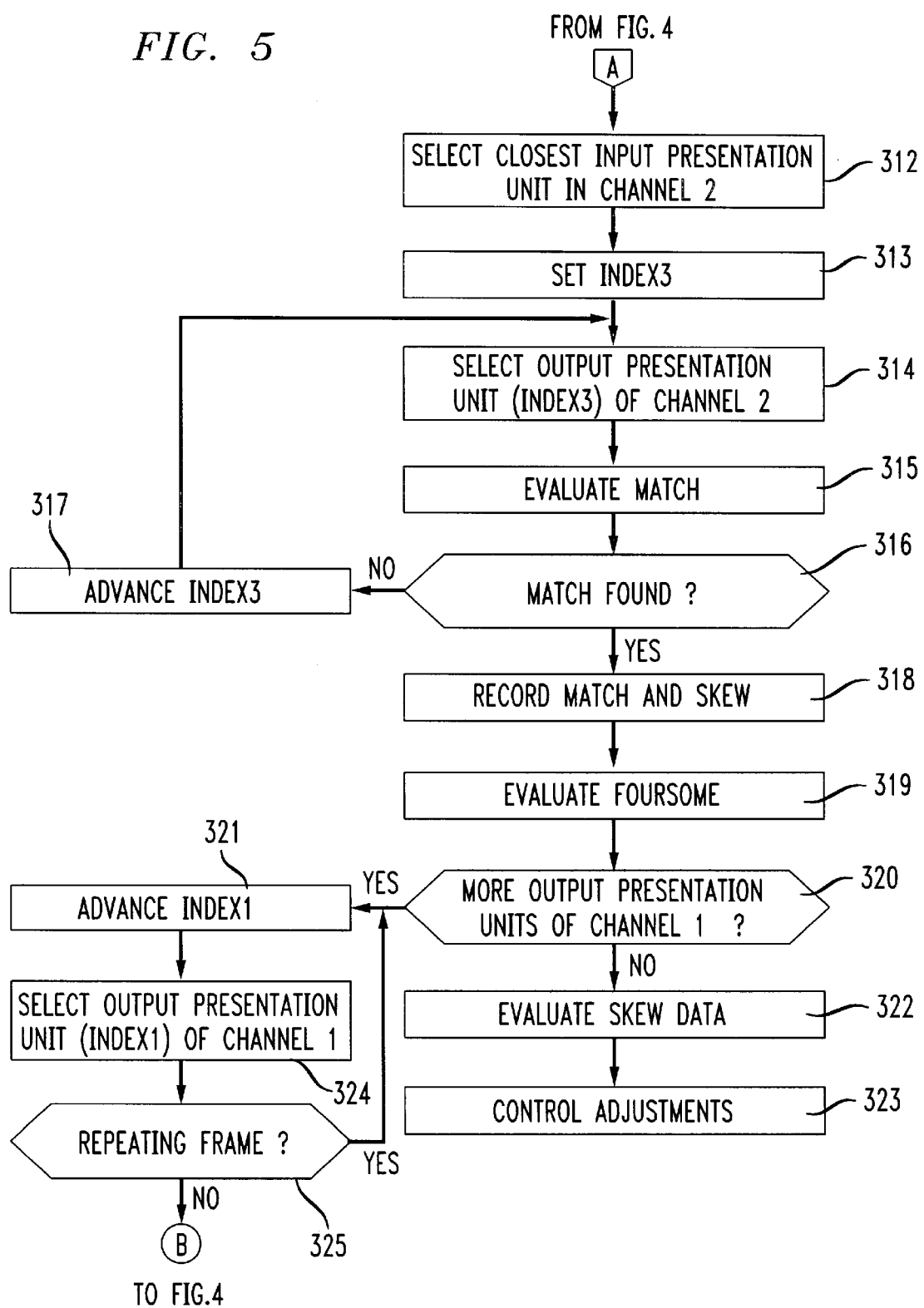

FIGS. 4 and 5 present a flow chart of the process carried out to find matches. In accordance with one embodiment, test apparatus 107 presents a non-varying signal (e.g., image) to input ports 11 and 12, and network 100 delivers a corresponding signal at ports 11 and 13 (block 301 in FIG. 4). At some pre-selected repetition rate, block 302 evaluates whether the received signal corresponds to a signal sent by apparatus 107 that indicates a beginning of the test. As long as that is not the case, control passes to block 303 which evaluates the average noise level in each of the channels.

The process of evaluating the noise level involves the following concepts: determining the instantaneous noise level for each sample of the received signal, averaging it over an entire presentation unit to obtain a presentation unit noise level, and folding in the presentation unit noise level into an overall noise level calculation. To determine the instantaneous noise level with respect to a video signal, we compare each presentation unit sample to a corresponding sample in an immediately preceding corresponding presentation unit. That is, when the presentation unit is an entire video frame, the corresponding presentation unit is the immediately preceding presentation unit, and the corresponding sample is the sample in the preceding presentation unit that corresponds to the same video frame pixel. For an audio signal, a more appropriate measure may be the signal's envelope, or the signal's power spectrum.

Since test store 107 outputs a non-varying signal prior to the actual test sequence, block 302 is tuned to a substantial change in the incoming signal. In response to a detection of such a change, block 305 permanently switches the process flow path from block 303 to block 304. The detection of a change in the incoming signal is an action that block 303 also needs to undertake, and in actual software implementations the same software module may be used. For sake of clarity, however, FIG. 4 presents distinct blocks 302 and 303.

As indicated above, to detect a change in presentation units when those units represent a video signal, corresponding samples of the frame are compared and, as is done in many other applications, the square of the difference is accumulated and averaged. This is typically referred to as "means square error" (MSE) calculation. Actually, it is not required that all of the pixels that form the frame and are included in the presentation unit need to be involved in the calculation, a subset of the frame is sufficient.

To obtain a measure of the overall, average, noise level, block 303 stores the noise calculation results of a selected number of presentation units, and as each new calculation is presented, it is stored, added to an "average noise" calculation, and the oldest entry is deleted from the store and subtracted from the "average noise" calculation. When block 302 decides that the test sequence has begun, the state of the "average noise" calculation represents the measure of the average noise that is introduced by network 100 (and by the digitization process that created the data kept in store 107).

Once the test sequence begins to appear at the output ports of network 100, processor 105 applies correction factors to the data, applies a time stamp to the data, and stores the data in store 106. The time stamping of data out of network 100 should follow the paradigm of the time stamping of data injected into network 100 (e.g., at the end of the presentation units). The start of the output presentation unit time stamping clock should be synchronized to the start of the received test sequence. For example, if the data of store 107 is applied to ports 10 and 12 at 1 msec intervals, and the actual test sequence has the time stamp of 1023 msec, then the output presentation unit time stamping clock should be set so the first output presentation unit that is not diverted to the average noise calculation of block 303 should have a time stamping of 1023 msec. Conveniently, the output data received at ports 11 and 12 and the associated time stamping may be kept in store 106 in a table format, just as the input data and its associated time stamping is also kept in store 106.

The correction factors applied to the data (when the data represents a video frame) are gain, level offset, horizontal shift, vertical shift, and spatial scaling. ANSI T1.801.03-1996 standard defines methods for measuring average gain and level offset, in addition to manual and automated methods for measuring active video area and active video shift.

It should be kept in mind that it is advantageous to measure noise, and the needed correction factors, as well as possible in order to minimize the difficulty in determining matches (described below), but obtaining measurements that are less than best-possible is not a fatal failure and, indeed, may have no effect at all on the final results.

Once the data of ports 11 and 13 is captured and placed in store 106, the process of determining matches between input presentation units and output presentation units may proceed. Accordingly, block 304 sets an index1 to 1 and passes control to block 305 where an output presentation unit that corresponds to the value of the index1 is retrieved from store 106. Thereafter, block 306 sets index2 and passes control to block 307.

The value of the various indexes employed in connection with FIGS. 4 and 5 is simply an ordinal position within the tables of store 106 that keep the input and output presentation units. The value to which index2 is set is, in a sense, a designer's choice. For example, if the designer is fairly confident about the process, the designer may decide that index2 should be set to the value of index1, indicating that a search for a match should begin at the time stamping of the last-matched input presentation unit (this shall become clearer in the discussion that follows). Alternatively, the designer may choose to set index2 to 1, indicating that the search for a match should begin with the first input presentation unit kept in store 106.

Once index2 is set, block 307 retrieves from store 106 an input presentation unit that corresponds to index2 and passes control to block 308 which calculates a MSE measure relative to the output presentation unit of index1 and the input presentation unit of index2. Control then passes to block 309 which determines whether a match has been found and, if not, control passes to block 310 which advances index2 and returns control to block 307.

The determination made by processor 105 that corresponds to block 309 can take various forms. When the selected paradigm for initial setting of index2 is to set it to the value of index1, then the expectation is that the next output presentation unit considered and the next IPO considered will match. The only reason to conclude that the two do not match is to find that the next input presentation unit or some other nearby input presentation unit forms a better match. To make that determination, processor 105 needs to make at least one pass through block 310 and needs to keep a measure of the "best current match" MSE calculation. As each pass is made though block 310, a new match calculation is made by block 308, and block 309 has a new opportunity to compare the computed MSE calculation to the "best current match" MSE calculation. The method selected by a designer for block 308 is, of course, a designer's choice. One approach may be to select as the match the input presentation unit that has the best (i.e., lowest) MSE within some selected, fixed, number of the initially set value of index2. A more sophisticated approach may be to make the selection tentative and see whether subsequent selections make sense (i.e., not too many input presentation units are skipped before a match is declared, or the MSEs of the selected input presentation units are uncharacteristically higher than the background noise level). If the tentative selection is proved to be poor, processor 105 can back up and make another selection.

Once a match between an output presentation unit and an input presentation unit is determined, processor 105 notes the time stamping of the output presentation unit and the matched input presentation unit and stores their difference, that is, the skew between the output presentation unit and its matched input presentation unit. Block 311 records this skew and passes control to block 312 in FIG. 5.

Continuing the discussion relative to FIG. 5, the next step is to select an input presentation unit from the other channel (e.g., channel 102, if the calculations of FIG. 4 were made on the data of channel 101). In FIG. 5, the "other channel" is marked as channel 2. Block 312 selects the input presentation unit of channel 2 that most closely corresponds in its time stamp to the time stamp of the input presentation unit selected as the match in block 309. When the signal of channel 2 represents voice that accompanies the signal of channel 1, most likely the time stamp of the voice presentation unit will be identical to that of channel 1. Having selected an input presentation unit, block 313 sets index3 so that a matching output presentation unit may be found. Since it may be equally likely that the channel 2 signal arrives at an output port prior to the channel 1 signals, index3 is selected to be less than index1 (except, of course, when index1=1). Block 314 retrieves an output presentation unit that corresponds to index3 and block 315 and proceeds to calculate a match score. When the signal on channel 2 represents audio, the match score may be a mean square error of the comparison between the envelopes of the signal, the envelopes of the presentation units' power spectra, or between individual power spectrum samples of the presentation units. Cross correlation can also be used to find matches in presentation units. When the signal on channel 2 is data, the match score may be a mean square error of the sample to sample comparison of the data. The subjects of the match evaluation are the input presentation unit selected by block 312 and the output presentation unit retrieved by block 314. Block 316 evaluates whether a match has been found, and as long as a match is not found, control passes to block 317 which advances index3 and returns control to block 314. When a match is found, control passes to block 318 which notes the time stamping of the input presentation unit selected by block 312 and the time stamping of the matched output presentation unit, calculates a skew value and stores it.

The skew values determined by blocks 311 and 318 tell of changes in delay (relative to the first presentation unit where the time-stamping clock of processor 105 was set). The difference in delay between the channels—the channels' skew—is evaluated in block 319 by subtracting the skew value of block 318 from the skew value of block 311.

This ends the calculations for one foursome of presentation units. Block 320 evaluates whether there are remaining output presentation units of channel 1 and, if so, block 321 increments index1 and passes control to block 324. Block 324 retrieves the output presentation unit indicated by index3 (just as block 305 does) and passes control to block 325 which assesses whether the retrieved output presentation unit is a repeated output presentation unit. If so, control returns to block 321. Otherwise, control returns to block 306. When no more output presentation units are needed to be matched, block 320 passes control to block 322 which evaluates whatever parameters a designer may be interested in. This may include, for example, parameters that apply to the group of presentation units that were injected into network 100 by test store 107; such as the average, median, maximum, or minimum of the channels skew, etc.

The notion of not using repeating frames stems from the assumption that repeating frames may be ones that might not have come from source 107 and might not have traversed network 100. Various approaches may be taken to identify repeating frames. One such approach is to compare the output presentation unit of channel 1 retrieved by block 324 with the output presentation unit of channel 1 that has been employed in block 311. The comparison, as in the case of finding matches, may be based on MSE calculations. When the difference between the just-retrieved output presentation unit and the previously used output presentation unit is greater than the average noise level by some preselected amount, e.g., 1.5 times the average noise level, then the conclusion is reached that the just-retrieved output presentation unit is not a repeat output presentation unit.

The information developed pursuant to this disclosure may be useful to simply characterize the channels of network 100 so that a better understanding of its capabilities can be had, so that it can be improved, or so that channels are selected from among the channels available in network 100 that provide acceptable performance. Alternately, the information developed can be used, in accordance with block 323, to modify the relative delay of the signals provided to users that are coupled to ports 11 and 14. This is achieved, as depicted in FIG. 1, with controllable delay elements 103 and 104. Based on the value of, say, the mean channels skew, the appropriate delay element is induced to add a delay between its input and output. While this increases the overall delay, the reduced (or eliminated) channels skew results in a better perceived transmission.

The description above goes to some length to identify repeating output presentation units of channel 1 and to exclude them from consideration. At least in part, this is based on the assumption that the input does not have repeat input presentation units and that therefore it would be a waste of computing resources to look for non-existent matches. However, there are situations where the input can, in fact, have repeating input presentation units, e.g., movies that are converted for transmission over an NTSC signal format. In such a case, it might be beneficial to not lose whatever information is provided by obtaining the skew values of the repeating frames. This can be achieved by first excluding the repeating output presentation units, as described above, and inserting, just prior to the block 322 step, a process for going over the input data and identifying those repeating input presentation units that have not been accounted for. At this point, of course, one has a pretty good measure of the range of index values of output presentation units that need to be considered, and the process of FIGS. 4 and 5 (excluding the steps prior to block 305, following block 320, and also excluding the test of block 325) can be carried out within the appropriate ranges for index1, index2 and index3. When all of the input presentation units have been accounted for, the steps of blocks 322 and 323 can be carried out.

The above description does not provide a mechanism for evaluating the absolute delay in the network 100, but that can be achieved by store 107 having data without a time stamp and by including a mechanism for stamping that data, as well as the data received at ports 11 and 13, with a common clock (or two clocks that are synchronized to each other). As the data is sent by store 107 to ports 10 and 12, it is time stamped and the stamping is recorded. All of the signals received at ports 11 and 13 are also time stamped and recorded. Thereafter, the signals of store 107 and the time stamping of that signal are transmitted (i.e., non-real time) to processor 105 and the matching and calculation process of FIGS. 4 and 5 can proceed.

The description presented above contemplates that the channel 1 signal is a video signal and that the channel 2 signal is an accompanying audio signal. It may be noted that the very same principles apply when the channel 2 signals represent digital signals that accompany the video signal of channel 1, such as closed caption information, cursor movement information, video tape machine controls, etc. Also, the description presented above addresses a progressive scan video signal, but it is quite clear that the principles disclosed herein apply with equal vigor to NTSC signals. The video signal segment that is selected may be a field, rather than a frame, but the rest of the process would remain the same.

Still further, although the process presented starts with an output presentation unit, then selects a matching input presentation unit, then identifies a corresponding input presentation unit on the other channel, and lastly finds a matching output presentation of the other channel, other approaches for identifying the foursome of presentation units will do equally well. Yet further, while the presentation above proceeds with the matching task from early presentation units to later presentation units, the reverse time order can be taken. Indeed, any time order, or even no time order, may be employed, as long as a sufficient number of the foursomes are identified.

I claim:

1. A method for assessing temporal relationships between communication channels, comprising the steps of:

applying to a first channel a first sequence of input presentation units (channel 1 input presentation units), applying to a second channel a second sequence of input presentation units (channel 2 input presentation units), associating a first time stamp with each of the input presentation units in accordance with a temporal relationship between the input presentation units, receiving a first sequence of output presentation units from the first channel (channel 1 output presentation units), receiving a second sequence of output presentation units from the second channel (channel 2 output presentation units), associating a second time stamp with each of the output presentation units in accordance with a temporal receipt of the output presentation units, identifying a foursome of presentation units comprising a channel 1 output presentation unit, a channel 2 output presentation unit, a channel 1 input presentation unit, and a channel 2 input presentation unit, where the channel 2 input presentation unit in the foursome has an associated time stamp that is closer to the associated time stamp of the channel 1 input presentation unit in the foursome than the associated time stamp of any other channel 2 input presentation unit, and where the channel 1 and channel 2 output presentation units in the foursome match the channel 1 and channel 2 input presentation units in the foursome, respectively, and evaluating a difference in time delay experienced by presentation units flowing through the first channel and the second channel by computing differences in the time stamps of the presentation units in the foursome.

2. The method of claim 1 where the steps of receiving the first sequence and the second sequence include applying correction factors to the received sequences.

3. The method of claim 1 where the step of evaluating carries out the calculation $(Tout_1-Tin_1)-(Tout_2-Tin_2)$, where $Tout_1$ is the time stamp of the channel 1 output presentation unit in the foursome, $Tin_1$ is the time stamp of the channel 1 input presentation unit in the foursome, $Tout_2$ is the time stamp of the channel 2 output presentation unit in the foursome, and $Tin_2$ is the time stamp of the channel 2 input presentation unit in the foursome.

4. The method of claim 1 where the steps of identifying a foursome and evaluating a difference in time delay are repeated, and further comprising a step of evaluating at least one parameter relative to the set of differences in time delay that are obtained from the repeated step of evaluating a difference in time delay.

5. The method of claim 4 where the repeating is for less than all of the channel 1 output presentation units.

6. The method of claim 4 where the repeating is skipped for channel 1 output presentation units that match a preceding channel 1 output presentation unit within a preselected matching level.

7. The method of claim 6 where the preselected matching level is related to noise introduced by said first channel.

8. The method of claim 4 where the evaluated parameter is an average difference in time delay.

9. The method of claim 4 further comprising a step of adjusting a delay in the first channel and the second channel in accordance with at least one of the parameters evaluated relative to the set of differences in time delay.

10. The method of claim 1 where the step of identifying a foursome comprises:

selecting a channel 1 output presentation unit, finding a channel 1 input presentation unit that matches the selected output presentation unit, identifying a channel 2 input presentation unit with the closest time stamp to the time stamp of the found channel 1 input presentation unit, and finding a channel 2 output presentation unit that matches the identified channel 2 input presentation unit.

11. The method of claim 10 where an input presentation unit matches an output presentation unit when the MSE measure of the difference between the input presentation unit and the output presentation unit is smaller than the MSE measure of the difference between the input presentation unit and other output presentation units.

12. The method of claim 10 where the first input presentation unit represents a video frame and the first output presentation unit represents a video frame, and where an output presentation unit matches an input presentation unit when a mean square error measure formed from a set of pixels of the input presentation and corresponding pixels of the output presentation unit is smaller than the mean square error measure formed from pixels of the first output presentation unit and pixels of other input presentation units.

13. The method of claim 12 where the set of pixels contains less than all of the pixels of a video frame.

14. The method of claim 10 where an input presentation unit matches an output presentation unit when the MSE of the difference between the input presentation unit and the output presentation unit is smaller than the MSE of the difference between the output presentation unit and other input presentation units.

15. The method of claim 1 where the step of identifying a foursome comprises:

selecting a channel 1 input presentation unit, identifying a channel 2 input presentation unit with the closest time stamp to the time stamp of the selected channel 1 input presentation unit, finding a channel 1 output presentation unit that matches the selected channel 1 input presentation unit, and finding a channel 2 output presentation unit that matches the identified channel 2 input presentation unit.

16. The method of claim 1 where the channel 1 input presentation units correspond to a video signal and each channel 1 input presentation unit represents a video frame.

17. The method of claim 1 where the channel 1 input presentation units correspond to a video signal with a duration that is equal to the duration of a frame of the video signal, and each channel 2 input presentation unit represents an audio segment having a duration that is essentially equal in duration to the channel 1 input presentation unit.

18. The method of claim 1 where the channel 1 input presentation units correspond to a video signal with a duration that is equal to the duration of a frame of the video signal, and each channel 2 input presentation unit represents a data that is associated with a corresponding frame, where corresponding frames share the same time stamp.

19. The method of claim 1 where the presentation units of the first channel correspond to an NTSC video signal and each presentation unit represents a video field.

* * * * *